Jan. 27, 1942.  C. S. JOHNSON  2,271,434
PORTABLE MATERIAL HANDLING APPARATUS
Filed March 2, 1939  7 Sheets-Sheet 2

Inventor
Charles S. Johnson
By
Attorneys.

Jan. 27, 1942.　　　　C. S. JOHNSON　　　　2,271,434
PORTABLE MATERIAL HANDLING APPARATUS
Filed March 2, 1939　　　7 Sheets-Sheet 3
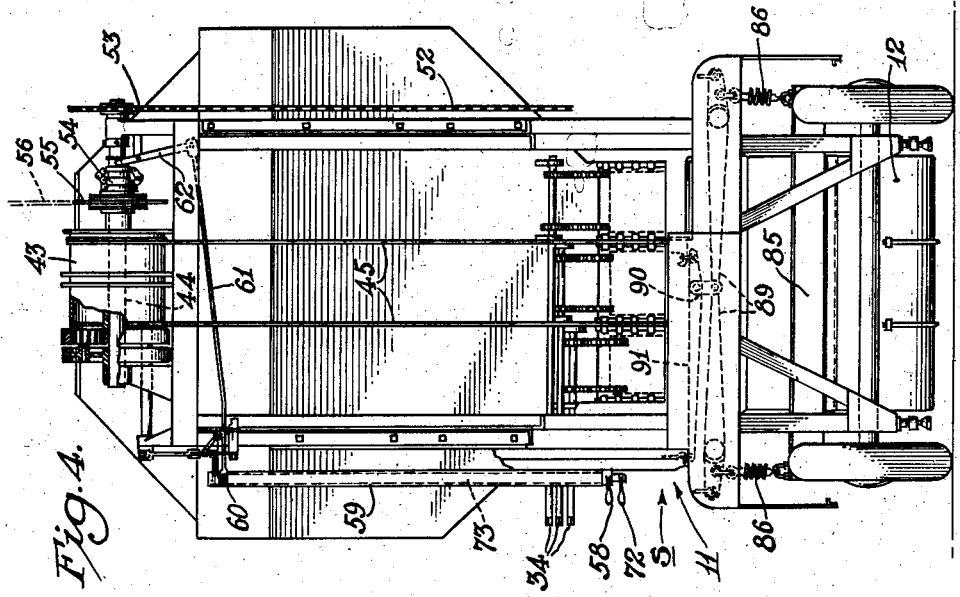
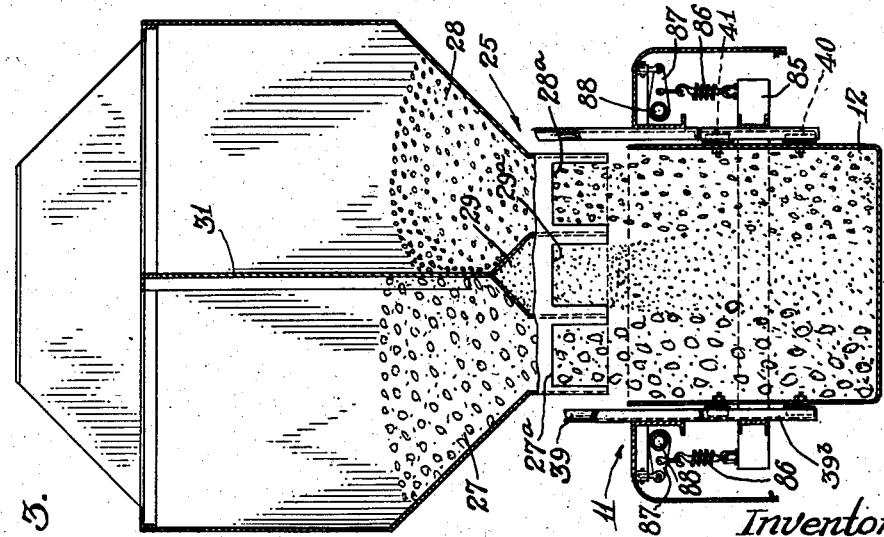
Inventor
Charles S. Johnson
BY
Attorneys.

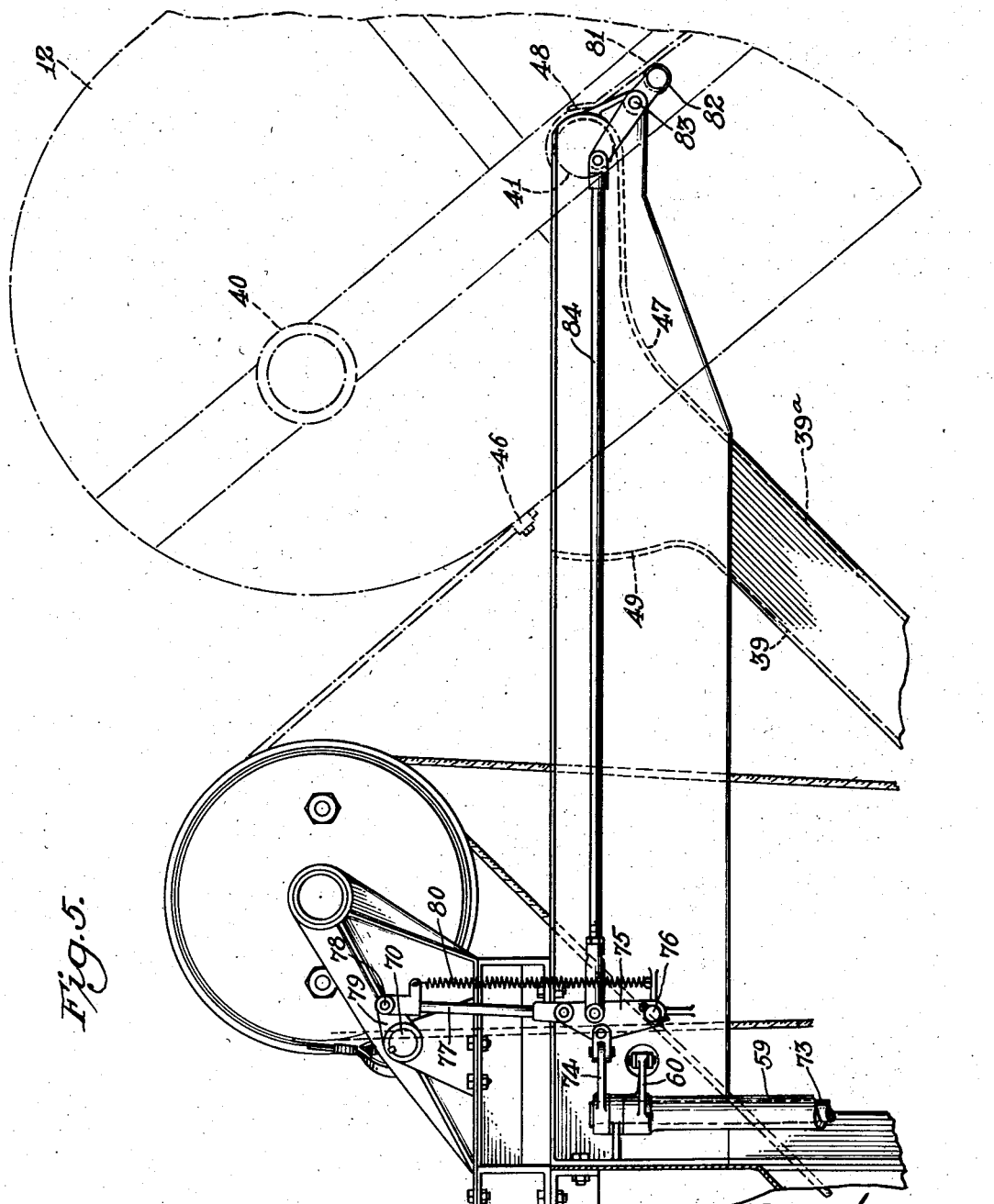

Jan. 27, 1942.  C. S. JOHNSON  2,271,434
PORTABLE MATERIAL HANDLING APPARATUS
Filed March 2, 1939  7 Sheets-Sheet 5
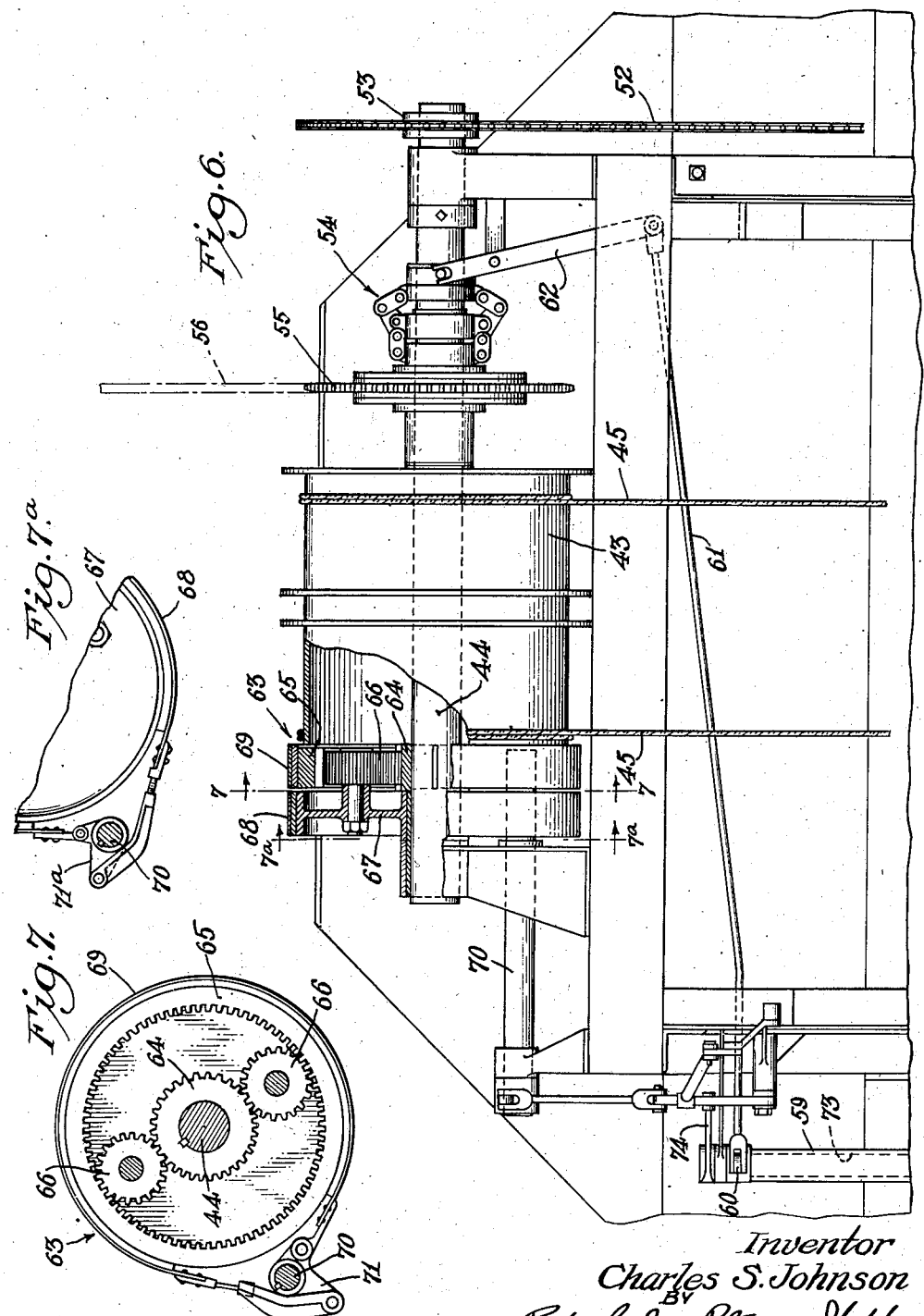
Inventor
Charles S. Johnson
Attorneys.

Jan. 27, 1942.　　　C. S. JOHNSON　　　2,271,434
PORTABLE MATERIAL HANDLING APPARATUS
Filed March 2, 1939　　　7 Sheets-Sheet 6
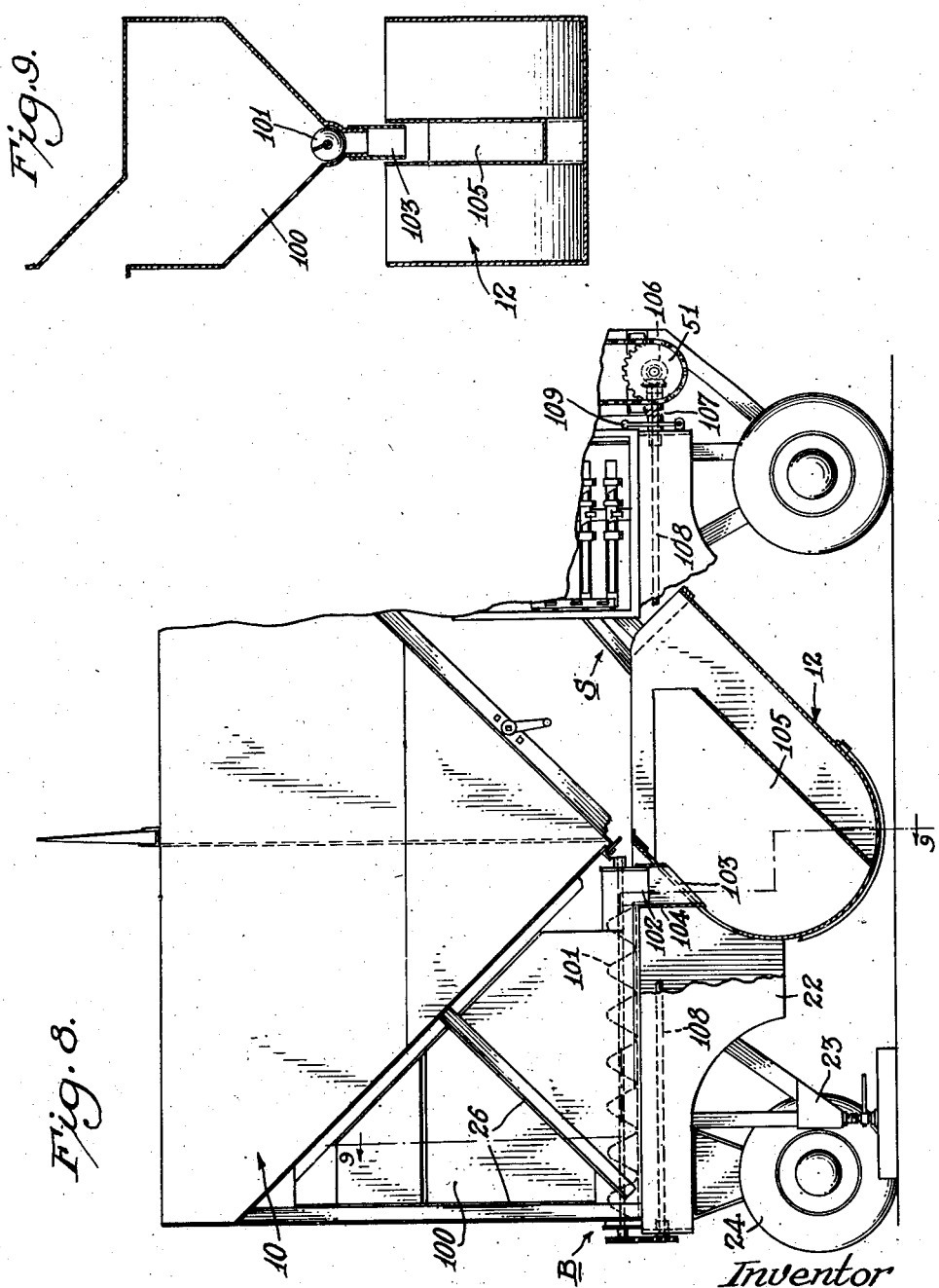
Inventor
Charles S. Johnson
BY
Attorneys.

Jan. 27, 1942.  C. S. JOHNSON  2,271,434
PORTABLE MATERIAL HANDLING APPARATUS
Filed March 2, 1939   7 Sheets-Sheet. 7
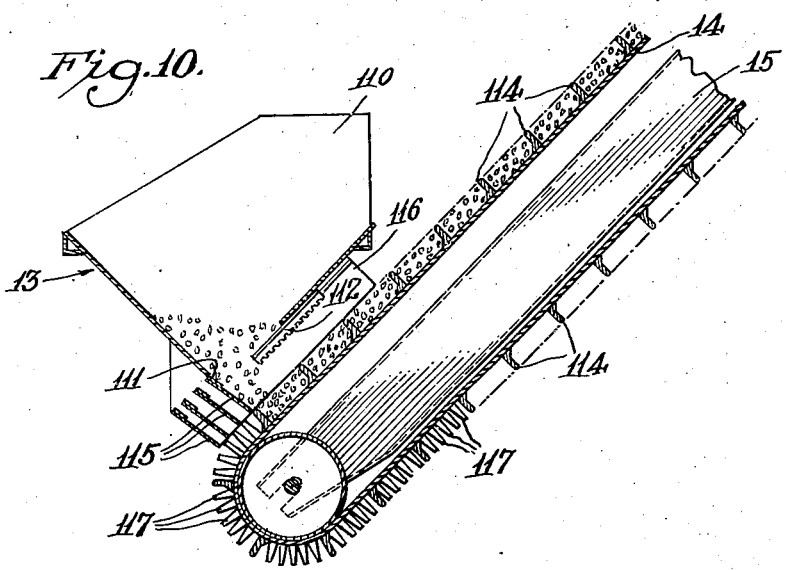
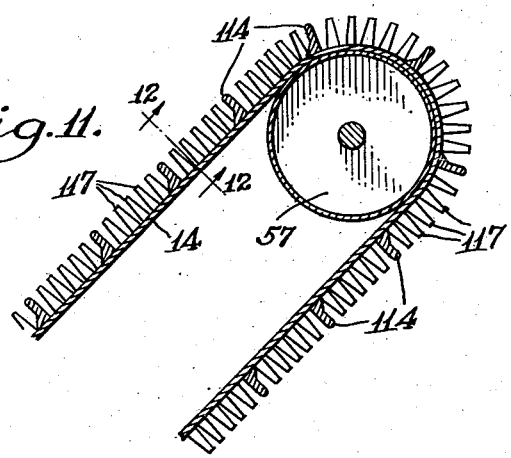
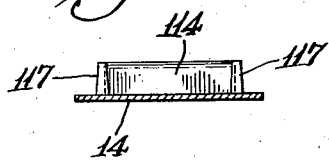
Inventor
Charles S. Johnson
BY
Parker, Carter, Pitzner & Hubbard
Attorneys.

Patented Jan. 27, 1942

2,271,434

UNITED STATES PATENT OFFICE 2,271,434

PORTABLE MATERIAL HANDLING APPARATUS

Charles S. Johnson, Champaign, Ill., assignor to The C. S. Johnson Company, Champaign, Ill., a corporation of Illinois Application March 2, 1939, Serial No. 259,391

6 Claims. (Cl. 214—2)

The invention relates to portable material handling apparatus and more particularly to such apparatus suitable for use with loose bulk materials such as sand, gravel, crushed rock, or other aggregates used in making mixed concrete or, on the other hand, for use with such dry batch materials as are used for paving and road surfacing.

In making, for example, mixed concrete in fairly large quantities it has heretofore generally been the practice to utilize stationary central mixing plants. In these plants the materials are placed in large overhead storage bins, flowed by gravity into weigh batchers below the bins, and from the batchers the materials are chuted into one or more mixers located at a still lower level. Such plants are much too high and bulky to have any but a fixed mounting, particularly in view of the location of the elements serially one above the other. To move such a plant necessitates not only costly dismantling and reassembly, but also a very considerable loss of time. On the other hand, efficient mixer operation requires adequate apparatus to insure a steady supply of successive batches of accurately proportioned materials. Accordingly, the feeding and batching mechanisms should be carefully coordinated with the mixer not only to insure uniformity of product, but also minimum idle time for the mixer between mixing cycles. It will thus be seen that portability cannot be achieved at the sacrifice of effectiveness and efficiency of the apparatus associated with the mixer without a consequent sacrifice of efficiency of mixer operation and uniformity of product.

One general object of the invention is to provide a coordinated batching and charging apparatus that is capable of affording maximum efficiency of operation for an associated mixer with uniformity of mixer product, and which is also capable of easy transport with a minimum expenditure of time and labor. In the illustrative construction herein shown, the apparatus has been segregated into a series of units carried by separable wheeled vehicles. Each of these vehicles and its load is sufficiently small in its dimensions and weight so that it conforms to the usual highway regulations governing such characteristics. Furthermore, the parts are so arranged that a coordinated control of the whole system can be carried out from a single ground level station. Moreover, an adequate reserve supply of batch constituents is afforded, and the initial charging and final discharging take place at ground level.

Another object of the invention is to provide a conveniently and readily portable batching apparatus including gravity feeding reserve bins for the batch constituents, which is of such character that it may be effectually used, not only for charging a concrete mixer, but also for preparing batches of many other types of loose, bulk materials as, for example, in the dry batching of road surfacing or paving mixtures.

The invention also resides in various important structural improvements in the apparatus by virtue of which minimum cost, size and weight are combined with effectiveness and efficiency of operation.

Further objects and advantages of the invention will become apparent as the following description proceeds, taken in connection with the accompanying drawings in which:

Fig. 3 is a vertical transverse sectional view along the line 3—3 in Fig. 2.

Fig. 4 is an end elevation of the unit of Fig. 2.

Fig. 5 is an enlarged fragmentary side elevation of a hoist and conveyer drive mechanism included in the unit of Fig. 2.

Fig. 6 is an end elevation of the apparatus shown in Fig. 5.

Figs. 7 and 7ª are detail sectional views along the lines 7—7 and 7ª—7ª, respectively, in Fig. 6.

Figure 2:
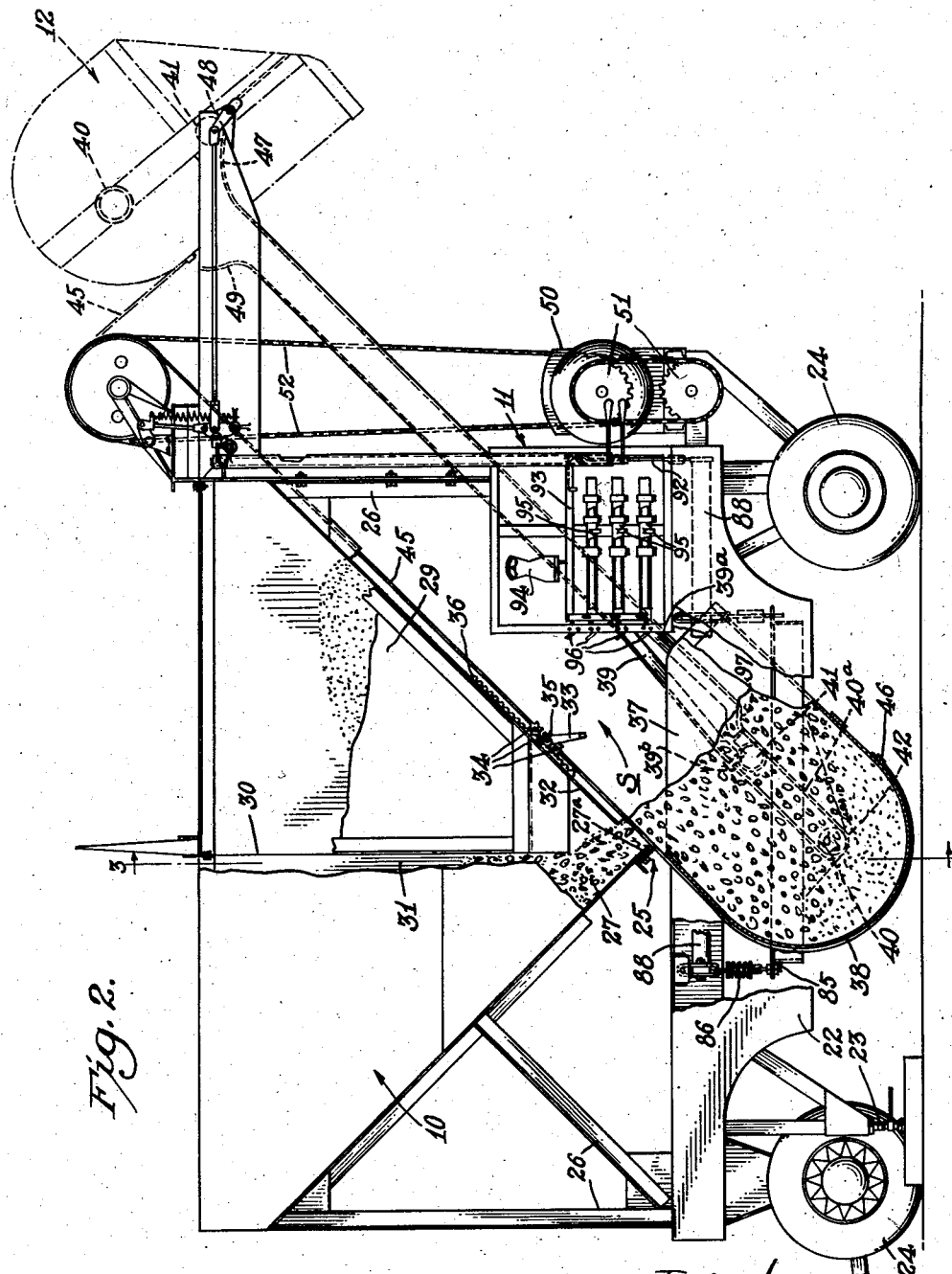
Fig. 2 is an enlarged side elevation partly in section of the batching and feeding unit included in the apparatus of Fig. 1.

Fig. 8 is a partial side elevation of a modified form of unit of the general type shown in Fig. 2.

Fig. 9 is a vertical sectional view along the line 9—9 in Fig. 8.

Figure 1:
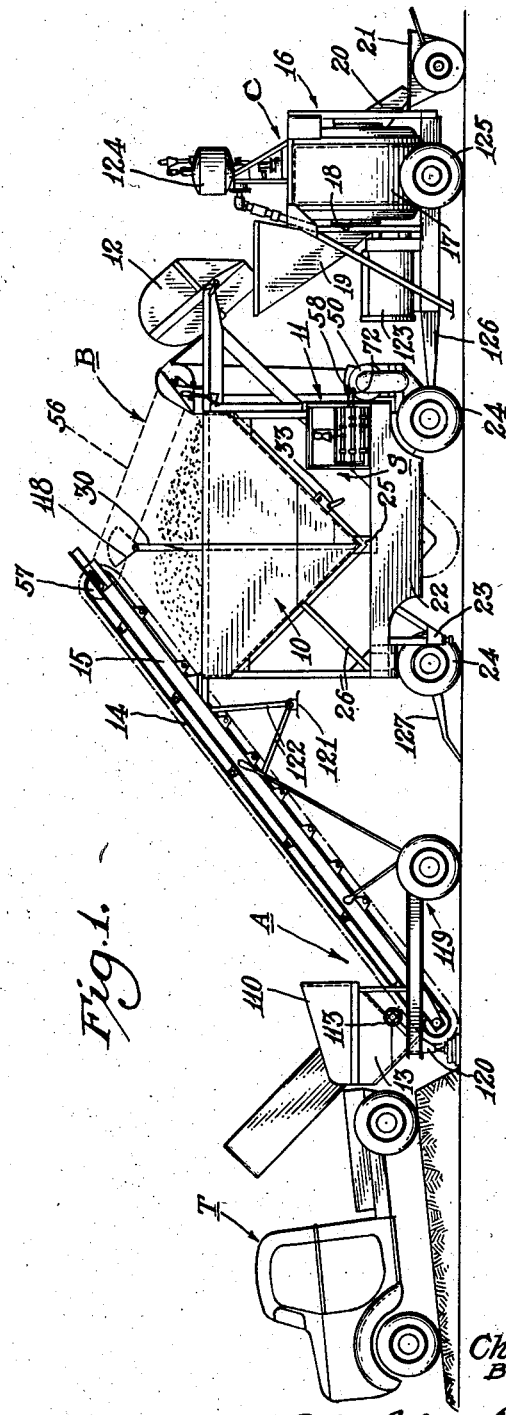
Figure 1 is a side elevation and general view of an apparatus embodying the invention.

Fig. 10 is a vertical sectional view of the feeding end of the conveyer apparatus shown in Fig. 1.

Fig. 11 is an enlarged sectional view of the discharge end of the conveyer.

Fig. 12 is a partial transverse sectional view along the line 12—12 of Fig. 11.

For purposes of illustration the invention has been exemplified herein (Fig. 1) as embodied in a concrete mixing apparatus. It will be apparent to those skilled in the art, however, that the invention is applicable in certain of its aspects to other forms of apparatus and may be used for other purposes, such, for example, as the dry batching of road paving or surfacing mixtures. Accordingly, even though a particular embodiment of the invention has been described in some detail, there is no intention to thereby limit the invention to such embodiment, but, on the other hand, the appended claims are intended to cover all modifications and alternative constructions falling within the spirit and scope of the invention.

General arrangement of apparatus

The apparatus shown (Fig. 1) has been segregated into three units designated generally by the letters A, B and C, each of which is mounted upon or embodies a separate wheeled vehicle. By thus distributing the bulk and weight of the apparatus, each unit is sufficiently small that it conforms to the usual highway regulations governing permissible size and weight of vehicles. Accordingly, the apparatus can be readily transported from point to point as its use may require and only a very small amount of time is required in setting up the apparatus for operation at each new point of use.

The most important unit in the series is the central or intermediate unit B. It embodies a bin structure 10 providing a set of segregated storage compartments for reserve supplies of various selected loose, bulk materials such as sand, gravel and crushed rock or other aggregates used in making mixed concrete. Moreover, the unit B embodies a weighing mechanism 11 for weighing batches of material fed by gravity from the bin structure 10 into a skip or batch container 12. In general, the skip 12 is traversable from a loading and weighing position beneath the bottom apex of the bin structure 10, where it receives aggregates from the storage bin compartments, to an elevated discharge position where it is tilted into a dumping position shown in Fig. 1 for discharging its contents to the mixer included in the unit C.

As to the other units in the series, the unit A constitutes a loading means for feeding materials into the bin structure 10 from a ground level loading point. In brief, it includes a receiving hopper 13 and an endless belt 14 carried on an inclined frame 15. Materials are loaded into the hopper 13 as, for example, from a dump truck T and are carried by the conveyer belt 14 to the top of the bin structure where they are directed into a selected one of the bin compartments. At the other end of the line the unit C embodies a concrete mixer 16 of conventional form including the usual rotating mixing drum 17. Materials are charged into the mixer drum 17 at a charging opening 18 through a feed chute 19, and the mixed concrete is discharged through a chute 20 into any suitable receiver such as the cart 21.

Unified control for the system is accomplished by locating the controls for the weighing mechanism 11, the skip hoist and the drive for the conveyer 14, all at a common or single ground level station S on the unit B. In this way one man can readily control the entire batching and feeding mechanism and effectually coordinate its speed and periods of operation with that of the mixer 16.

One particular virtue of the apparatus is its flexibility of application. For example, the unit B is equally well adapted—and without any alterations and changes in construction—to feed batches of aggregates to a so-called mixer truck. Such trucks are of well known construction and ordinarily embody a horizontal rotating mixing drum with a top opening into which the constituents of the mix are charged. Such a mixing truck can be driven beneath the discharge position of the skip 12 so that the latter can charge directly into the truck. Similarly, the unit B can be used for dry batching road or paving materials and the batches of such materials can be dumped directly into a suitable truck or other conveyance from the skip 12.

Batching and feeding unit

The batching and feeding unit B (Fig. 1) embodies a four wheeled truck or a vehicle 22 provided with jacks 23 that can be used to lift the truck slightly while it is stationary so as to relieve the weight on pneumatic tires 24 provided on the wheels. The bin structure 10 carried by the vehicle 22 is of a generally inverted pyramidal shape with the bottom walls inclined down to an apex 25 at which point outlets for the bin compartments are located. A structural steel framework 26 supports the bin structure and the walls of the bins may be of suitable sheet metal. The interior of the bin structure (Figs. 2 and 3) is divided into three open-top compartments 27—29. The compartment divisions are formed by a central vertical transverse partition 30 which extends entirely across the bin structure, and a central longitudinal vertical partition 31, which divides the compartments 27 and 28 (Fig. 3) and extends only half the length of the bin structure. At the bottom of each compartment, adjacent the apex 25, is an outlet $27^a$—$29^a$ closable by its individual regulating gate. The regulating gate 32 for the bin 27 is shown in Fig. 2, and the regulating gates for the other two outlets are of the same form. The gate 32 is slidable longitudinal to completely close the outlet $27^a$ or to open it a predetermined amount. These gates are manipulable by a hand crank 33, attachable to any one of the corresponding three jack shafts 34. Each of these shafts carries a pinion meshing with a rack carried by the corresponding gate. For example, in the case of the gate 32, the corresponding one of the jack shafts 34 carries a pinion 35 meshing with a rack 36 on the gate. All of the jack shafts 34 are located for access at the single control station S.

The skip or batch container 12 (Fig. 2) is made of sheet metal and has flat side walls 37 as well as a rounded bottom 38. The top of the skip is cut off at an angle so that it is substantially horizontal when the skip is carried in an inclined position as shown at an angle of about 45°. A trackway, made up of two sets of opposed angle irons 39—$39^a$, follows the inclined bottom wall contour of the bin structure 10 so that the skip 12 can be traversed along the trackway from its loading position beneath the bin structure to its elevated discharge position (shown respectively in full and dot-dash lines in Fig. 2). The pairs of rollers 40—41, journaled on opposite sides of the skip, support it for movement along the trackway 39—$39^a$. The smaller rollers 41 roll along the lower tracks or angle irons $39^a$ while the larger rollers 40 bear against the under side of the flanged upper angle irons or tracks 39. Each pair of tracks 39—$39^a$ is joined at the lower end as indicated at 42 so as to form sockets for the rollers 40 to stop the skip in its loading position.

For hoisting the loaded skip a hoisting drum 43 (Fig. 4) is utilized. This drum is journaled on a horizontal shaft 44 and a pair of hoisting lines 45 are wound about it. The lower ends of the hoist lines 45 are led about the rounded bottom 38 of the skip 12 (Fig. 2) and anchored on its lower side at 46. The trackway 39—$39^a$ is fashioned to cooperate with this hoist line arrangement to accomplish automatic dumping of the skip 12 when it reaches its elevated discharge position. In particular, the lower tracks 39ª are curved horizontally outward at their upward ends as indicated at 47 (Fig. 2) and terminate in upwardly curved ends or abutments 48. Consequently, when the hoist lines 45 are wound up by the hoisting drum 43 the skip 12 moves upward along the trackways 39—39ª and the forward rollers 41 finally socket against the curved abutments 48. Thereafter, continued tension on the hoist lines 45 fulcrums the skip 12 about its forward rollers 41 until it reaches its tilted or dumping position (shown in dot-dash lines in Fig. 2). The upper ends of the tracks 39 are curved away from the lower track as indicated at 49 so as to clear the rear rollers 40. After the skip 12 has been emptied, a release of the tension on the hoist lines 45 permits it to tip back in a counterclockwise direction (as viewed in Fig. 2) due to gravity so that the rear rollers 40 are restored to their position on the trackway and the skip 12 then descends by gravity to its initial loading position.

To minimize the power actuating apparatus required, a single prime mover, such as a gasoline engine 50 (Fig. 2) is preferably utilized to drive both the skip hoisting drum 43 and the conveyer belt 14. For this purpose the gasoline engine 50 is connected through a speed reduction gearing 51 and a chain 52 (Fig. 2) with a sprocket 53 (Fig. 4) fast on the shaft 44. The shaft 44 is in turn connected at will with the conveyer belt 14 by means of a disengageable jaw clutch 54. This clutch connects the shaft 44 with a sprocket 55 loosely journaled on the latter shaft and connected through a chain 56 with a conveyer pulley 57 (Fig. 1). The clutch 54 is actuatable into either released or engaged position by a manually operated lever 58 (Fig. 4) located at the control station S and fixed on a vertical oscillatable sleeve 59. The upper end of this sleeve is connected through a crank 60 and links 61—62 with the clutch 54.

A combined differential gear type clutch and brake, designated generally by the numeral 63 (Figs. 6 and 7) is used for connecting the hoisting drum 43 to the driving shaft 44 and for holding the hoisting drum against rotation. This device includes a first terminal element or sun gear 64 (Figs. 6 and 7) keyed to the shaft 44 and a second terminal element or ring gear 65, meshing with the intermediate elements or planetary gears 66 which also mesh with the sun gear. The planets 66 are journaled in the usual manner on a spider 67 which is in turn loosely journaled on the shaft 44. The ring gear 65 or driven terminal element is fixed on the end of the hoisting drum 43 (Fig. 6). Accordingly, to connect the driving shaft 44 with the hoisting drum 43, the planets 66 are held against bodily rotation about the axis of the shaft 44 by tightening a clutch band 68 which encircles the spider 67. Similarly, to hold the drum 43 against rotation, a brake band 69, encircling the ring gear 65, is tightened to hold this latter gear against rotation while the planets 66 are permitted to revolve freely. Finally, to release the hoisting drum 43 for free rotation during gravital descent of the skip 12, both of the bands 68 and 69 are released.

The actuating mechanism for the bands 68—69, which control the combined clutch and brake mechanism 63, includes a horizontal rock shaft 70 (Figs. 6, 7 and 7ª). A pair of bell cranks 71 and 71ª are keyed to this rock shaft, the arms of the bell cranks 71 being connected to the free ends of the band 69 and the arms of the crank 71ª being keyed to the free ends of the band 68. As seen in Figs. 7 and 7ª, the bell crank arms are so arranged that, when the shaft 70 is oscillated in a clockwise direction, the clutch band 68 is tightened and the brake band 69 loosened, while upon being oscillated in the opposite direction the brake band 69 is tightened and the clutch band 68 is loosened. In an intermediate position both of the bands 68—69 are loose. To oscillate the rock shaft 70 in a clockwise direction for tightening the clutch band 68 the operator swings a hand lever 72 (Fig. 4) so as to oscillate a shaft 73 within the sleeve 59. This shaft in turn oscillates a crank 74 (Fig. 5) so that a toggle link 75, pivoted at 76, is swung to the left (as viewed in Fig. 5). This in turn pulls a second and pivotally connected toggle link 77 downward and to the left. This second toggle link 77 is pivotally connected at 78 to an arm 79 fast on the rock shaft 70. A contractile spring 80, anchored at its opposite ends adjacent the lower toggle pivot 76 and to the upper portion of the second toggle link 77, yieldably urges the toggle links to the left of their dead center position so as to hold the clutch band 68 engaged. When the skip 12 reaches its unloading position (Fig. 5) it automatically trips the toggle linkage so that the clutch band 68 will be loosened and the brake band 69 engaged to stop the hoisting drum 43 and hold it against rotation. For this purpose a side flange 81 is formed on the skip 12 which engages the outer end of the link 82 and swings the latter about its pivot 83 when the skip is tilted downward. The upper end of the link 82 is pivotally connected to a cross link 84 which is in turn pivotally connected to the lower toggle link. Accordingly, when the flange 81 strikes the link 82 the intermediate link 84 is pulled to the right (as viewed in Fig. 5) and the toggle linkage swung slightly to the right of its dead center position where it is held by the spring 80. The resultant upward movement of the upper end of the toggle link 77 oscillates the rock shaft 70 in a counterclockwise direction so as to effect the desired tightening of the brake band 69 and loosening of the clutch band 68.

To permit free gravitational descent of the skip 12 the operator need only swing the handle 72 a short distance in the opposite direction. This pulls the toggle linkage 75 and 77 back to its dead center position and in which both the brake and clutch bands are released so that the hoisting drum 43 is permitted to revolve freely for descent of the skip.

In order to weigh out desired amounts of material in each batch accumulated in the skip 12, the weighing mechanism 11 is utilized. This weighing mechanism is of more or less conventional form and accordingly is not believed to require a very detailed description. In general, it has been shown (Figs. 2, 3 and 4) as including a heavy rectangular steel frame or cradle 85 arranged to encircle the skip 12 when the latter is in its loading position beneath the bin outlets. Separate lower sections 39ᵇ and 40ª of the tracks 39—39ª are fixed to this cradle 85. Consequently, when the skip 12 is in its loading position the rollers 40—41 rest on these separate track sections so that the entire weight of the skip is carried by the cradle 85. The cradle is in turn hung by shock absorbing springs 86 (Fig. 3) on intermediate portions of scale arms 87 which are fixed on a pair of horizontal hollow shafts 88. The outer ends of the arms 87 are pivotally hung on the under side of the truck frame. Downward motion of the members 88, resulting from weight applied to the cradle 85, swings downward a pair of opposed inwardly projecting arms 89 (Fig. 4), which are connected thereto. These arms 89 are gathered by a shackle 90 and are connected through suitable links 91—92 with a scale beam 93 (Fig. 2).

The scale beam is connected to a visual indicator 94 which registers the weight of material in the skip 12. In addition, the beam 93 is connectible with any selected one of a series of auxiliary scale beams 95 which are rendered operative or inoperative by the usual beam lifters 96. The counterweights on the beams 95 can be set for various predetermined weights which are likely to be used in the batching and then the one of the beams 95 is selected for use which corresponds to the particular batch weight which is to be weighed. For example, when making up a batch of three materials, from the three bin compartments 27—29, the first beam 95 can be set for the weight of one material, the second beam for the total of the first two materials, and the third beam for the total of all three. In such case the first beam is rendered operative while the first material is fed into the skip, the second beam during the subsequent feed of the second material, and the third beam during the feed of the third material. It will be noted that the scale beams, beam lifters and visual indicator 94 for the weighing mechanism 11 are all readily accessible at the control station S.

To protect the weighing mechanism 11 against damage due to the impact of the skip 12 as it returns to its loading position, means has been provided for checking the speed of the skip's gravitational descent. In particular, humps 97 (Fig. 2) are formed in the lower tracks 39ª so that the rollers 40—41 will strike these humps and slow up the skip before it reaches the separate track sections 39ᵇ—40ª carried by the weighing cradle mechanism 85.

*Dry cement supply*

By virtue of the fact that the skip 12 is located substantially at ground level when in its loading position, dry cement can be easily added to its contents by a workman standing by the side of the unit B. For this purpose the open top of the skip 12 is dimensioned so that a substantial portion of it projects beyond the outlets for the bin compartments and is freely accessible while the skip is in loading position. With such an arrangement the workman can reach in beneath the rear overhang of the bin structure 10 (right hand side as viewed in Fig. 2) and pour into the top of the skip 12 a sack of dry cement or some similar amount which may be required in the batch.

In some instances weighing of the dry cement may be desired and in such case the modified arrangement of Fig. 8 may be conveniently utilized. In this construction a bin 100 for dry cement has been added to the unit B beneath the front overhang of the main bin structure. Cement from this bin 100 is fed into the skip 12 through a feed screw 101 communicating at its discharge end with a downwardly facing spout 102. This spout 102 registers with an open slot 103 in the upper side of the skip. A flexible shroud 104 surrounds the end of the spout 102. Dry cement entering the slot 103 passes into an inner container 105 within the skip 12 (see also Fig. 9). The upper end of the container 105 is open so that when the skip is tilted for discharging, the dry cement in the container 105 is spilled out over the aggregates which are simultaneously discharged from the skip. The feed screw 101 is connected in driven relation with a shaft 106, carrying the engine driven gear 51, through a clutch 107 and a shaft 108. The clutch 107 is manipulable by a hand lever 109 at the control station S. The operator can thus alternately engage and disengage the clutch 107 to feed successive increments of dry cement into the skip 12 until a predetermined amount is fed into it, as indicated by the weighing mechanism 11.

*Conveyer unit*

In the unit A (Fig. 1) the receiving hopper 13 has a generally rectangular open top bordered at its back and sides by an overflow guard 110. The hopper terminates in a bottom outlet 111 (Fig. 10) provided with a regulating gate 112 manipulable by a hand wheel 113 (Fig. 1).

To accommodate maximum incline of the conveyer, the belt 14 is provided with a series of spaced and rigid cleats or cross partitions 114 (Figs. 10—12). In the absence of some special loading arrangement, however, these cleats would be likely to jam material against the outlet of the hopper 13 and thus impede or stop the conveyer belt movement. To prevent such action a series of special deflector shields 115 (Fig. 10) are utilized for directing the material from the hopper 13 on to the conveyer belt 14. These deflector shields are located beneath the outlet 111 and are equal in width to the conveyer belt 14, being bordered at their sides by yieldable side guard plates 116. The shields 115 are flexible and resilient in character and are anchored at their upper ends with their lower or outer ends free. They are thus yieldably urged in the direction of conveyer belt movement and will yield in a downward direction sufficiently to prevent jamming of material between their free ends and the edges of the belt cleats 114.

In order to prevent side spillage of loose materials from the surface of the conveyer belt 14 an improved construction has been utilized. As shown in Figs. 11 and 12 herein a series of rigid upright arms or pickets 117 are fixed in closely spaced relation along the opposite side edges of the belt 14. Each of these pickets is anchored at its lower end to the belt and projects upward from the belt surface. As the belt moves over the curved periphery of the upper pulley 57, for example, the pickets 117 are spread apart slightly but permit the belt 14 to conform to the curvature of the pulley. Incidentally, any slight parting of the pickets 117 at this point is immaterial since the material is discharged from the surface of the belt at the upper end of the conveyer in any event.

Dispatching of the material from the conveyer belt 14 into a desired one of the bin compartments 27—29 is aided by a shield 118 (Fig. 1) pivoted on the top of the central bin partition 30. This shield 118 is oscillatable between two alternative angular positions shown respectively in full and dot-dash lines in Fig. 1. When in its full line position it underlies the end of the conveyer belt 14 and directs the material to the right hand side of the central bin partition 30. Sinilarly, when in its other position it deflects the material to the left hand side of the partition 30. The conveyer frame 15 can, of course, be shifted laterally so that the belt 14 overlies one or the other of the side-by-side compartments 27—28 so as to determine which of these two compartments will receive the material.

A wheeled support for the loading unit A (Fig. 1) is formed by a two wheeled truck 119 located at its lower end. When in use the extreme lower end of the conveyer is supported by suitable jack 120. To transport the conveyer from place to place it can be tilted down and secured to the rear end of a suitable motor truck by an attachment 121 carried by depending struts 122.

Batch receiving unit

As previously noted, the concrete mixer 16 (Fig. 1) of the unit C is of conventional form and, accordingly, a brief description will suffice. It embodies the usual rotating mixing drum 17 driven by the gasoline engine 123. Water for the mix is supplied from a suitable water batcher indicated at 124. Also, as previously noted, the aggregates and cement are fed to the mixer from the charging chute 19 and after being mixed are discharged by the chute 20 into a suitable receiver 21. A two wheeled trailer 125 carries the mixer 16 so that it can be easily transported and it may be connected to the unit B by trailer tongue 126. At its opposite end the unit B is provided with a suitable towing tongue 127 so that the units B and C can be readily towed from place to place.

In the event that it is desired to use the unit B for charging some other form of mixer or for batching materials other than those for use in a cement mixer the unit C can be removed. In this way a space is cleared beneath the discharge station for the skip 12 so that its contents can be dumped into another mixer, truck or other receiver.

Brief résumé of operation

In the operation of the apparatus of Fig. 1 the engine 50 is started and the conveyer belt 14 set in motion by engaging the clutch 54 (Fig. 4) by means of the hand lever 58 at the control station S. Material is then dumped into the receiving hopper 13 from time to time, as may be required, from the dump truck T or the like. This material passes up the conveyer belt 14 and is dispatched into one of the three main bin compartments 27—29 in accordance with the setting of the shield 118 and the upper end of the conveyer. The bin compartments are preferably maintained substantially full of the materials to be used in the mix so as to form an adequate reserve supply at an intermediate point in their path of travel through the apparatus. In this way adequate amounts of the materials are always kept on hand for forming a batch in the skip 12. As an example, the sand may be stored in one of the bin compartments, gravel in another, and crushed rock in the third.

To form a batch of aggregates in the skip 12 the skip is placed in its loading position beneath the bin outlets 27ª—29ª and on the weighing cradle 85. Then the operator opens the regulating gate for one of the bin compartment outlets through rotation of the handle 33. Furthermore, he shifts one of the beam lifters 96 (Fig. 2) and watches the movement of the corresponding scale beam 95 until the selected weight of material is accumulated in the skip, at which time the regulating gate is shut. Then he puts the next scale beam in operation by lowering its beam lifter 96 and opens the regulating gate of the next bin compartment. This procedure is repeated for all three of the bin compartments until the corresponding selected amounts of each of the aggregates is accumulated in the skip 12. Dry cement may then be dumped into the top of the skip while in its ground level loading position or if the construction of Fig. 8 is utilized the clutch 107 is engaged and a desired amount of dry cement fed into the cement container 105 by the feed screw 101.

Upon completion of the batch in the skip 12 the operator manipulates the hand lever 72 in order to engage the hoisting drum clutch and the skip 12 is traversed upwardly along the trackway 39—39ª. Upon reaching its uppermost position it is fulcrumed about the forward set of rollers 41 until tilted into its dumping position, at which time the hoist drum clutch is automatically disengaged and the brake engaged as previously described to hold the skip in dumping position. The batch of aggregates and cement flow from the skip 12 into the mixer charging chute 19 from which they are directed into the mixer drum 17. The mixing operation in the mixer proceeds in the usual manner and the mixed concrete is finally discharged into the receiver 21. After the skip 12 has been emptied, the brake on the hoist drum 43 is released and the skip 12 permitted to return by gravity along the trackway 39—39ª to its initial loading position.

From the foregoing it will be seen that precisely determined and proportioned batches of material can be fed to the mixer or the like with rapidity and precision. In view of the unified control station S, all of the controlling operations can be readily carried out by a single operator from ground level. Furthermore, in view of the fact that the loading of both aggregates and cement takes place at ground level these operations can be very easily carried out. To condition the apparatus for transport it is only necessary to disconnect the chain 56 between the engine driven shaft 44 and the conveyer pulley 57 after which the various units A, B and C can be towed along a highway to the next place of use.

I claim as my invention:

1. In an apparatus of the type described the combination of a wheeled vehicle, a bin structure mounted on said vehicle and having a generally inverted pyramidal bottom wall with an outlet in the apex for gravity discharge of its contents, said apex of the bottom wall being located close to ground level, an upwardly inclined trackway also carried by said vehicle and leading from said apex along said inclined bottom wall to an elevated upper point, a batch container supported for movement along said trackway from a loading position beneath said outlet to a discharge position at said upper point, the lower portion of said trackway beneath said outlet being structurally separate from the remainder thereof, and weighing means carried by said vehicle for supporting said lower portion of the trackway to weigh the container contents when the container is in loading position.

2. In an apparatus of the type described the combination of an upwardly inclined trackway, a batch container supported for movement along said trackway from a loading position adjacent the lower end of said trackway to a discharge position at the upper end of said trackway, rollers supporting said container on said trackway, a